April 19, 1949. H. HUTCHINGS 2,467,482
ADJUSTABLE WHEEL MOUNT
Filed Feb. 12, 1946 2 Sheets-Sheet 1
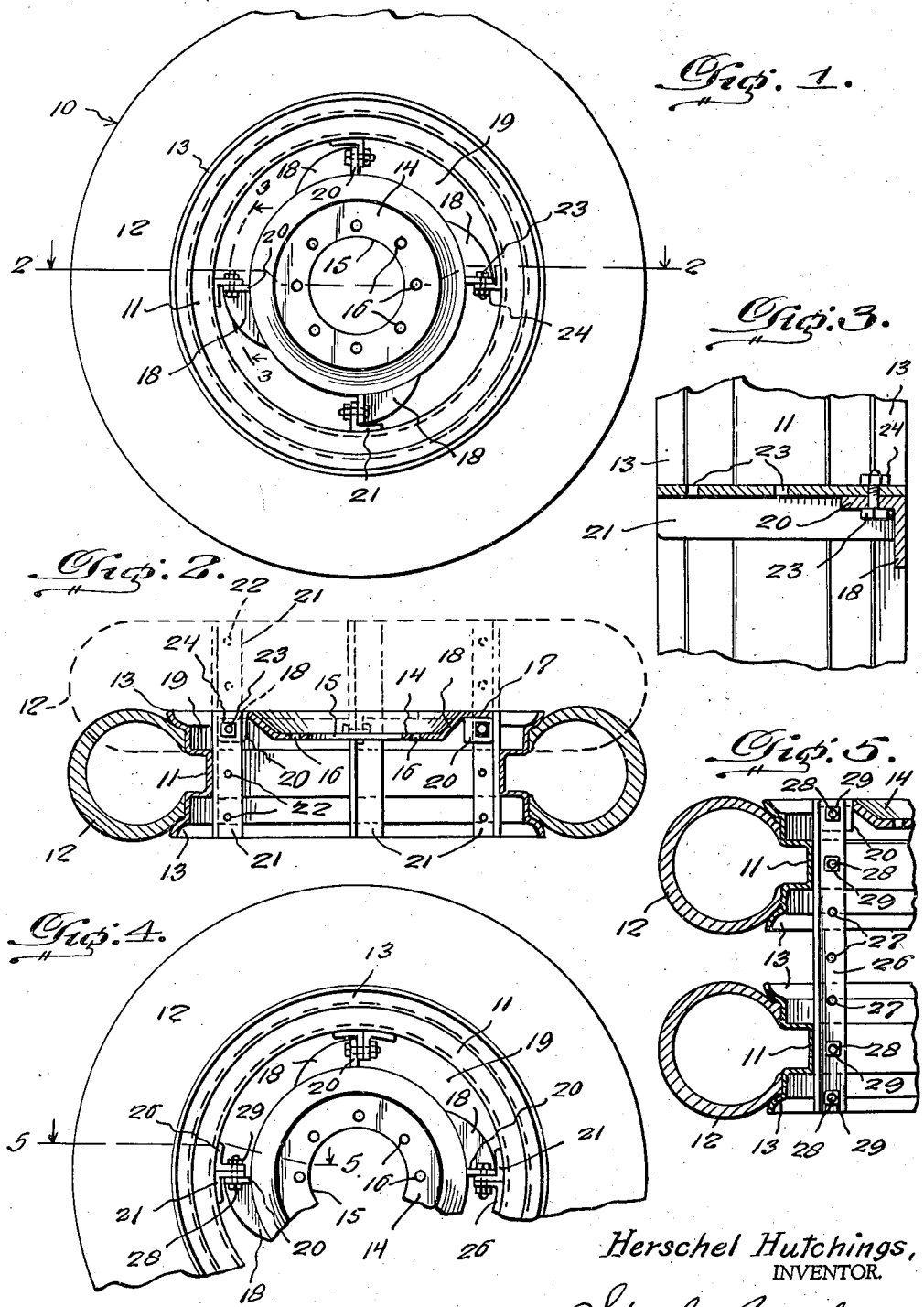
Herschel Hutchings,
INVENTOR.
BY Stanley Burch
Attorneys

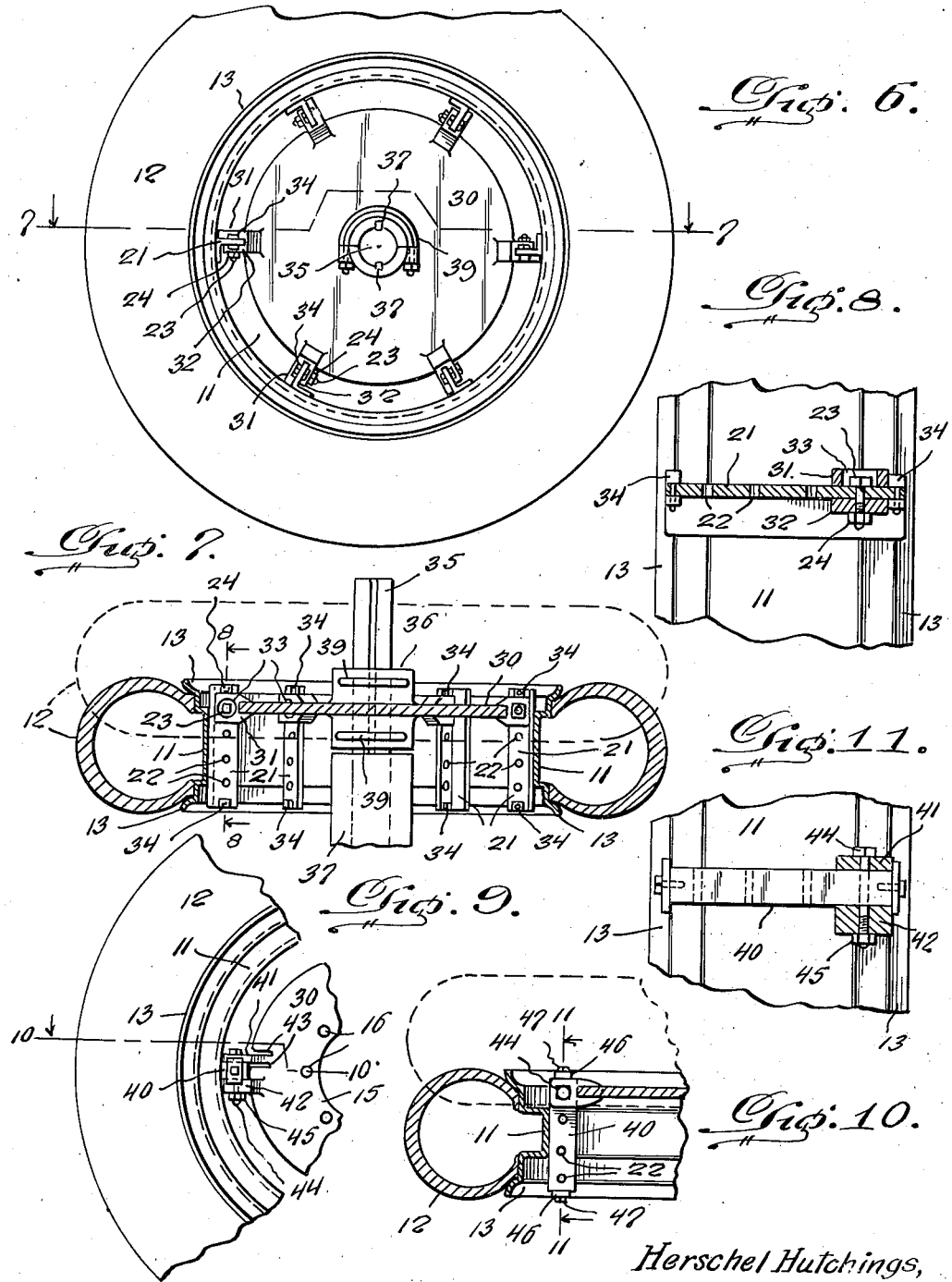

Patented Apr. 19, 1949

2,467,482

UNITED STATES PATENT OFFICE 2,467,482

ADJUSTABLE WHEEL MOUNT

Herschel Hutchings, Lubbock, Tex.

Application February 12, 1946, Serial No. 647,047

5 Claims. (Cl. 301—9)

My invention relates to an adjustable wheel mount or new and useful means, method, or apparatus for changing the position of wheels or rims and tires on the wheel center or disk so as to vary the distance between the wheels or adjust the tread for tractors or other machinery such as where the tractor is used to draw implements for row crop work and varying widths of treads are desired or necessary.

Ordinarily, adjustable wheels are so constructed that at some stage of adjustment, it is necessary to reverse the wheels or tires and rims or change the same from one side of the tractor or machine to the other. In either case, it is necessary to remove the wheels or tires and rims as a unit from the tractor or machine in reversing the same, and in the case of large wheels or tires and rims, two or more men are required to do the changing of the position of the wheels so as to obtain the desired adjustment of the tread.

The primary object of the present invention is to provide a novel and simple construction or mount for the wheels to facilitate the adjustment of the spacing or distance therebetween or tread width, and eliminate the necessity for reversing or changing the wheels from one side to the other, and in certain instances as where the wheels are mounted on the axle so that they may be adjusted in position on the axle, by sliding on said axle, to eliminate the necessity for reversing or changing sides of the wheels or tires, and rims.

Another object of the invention is to provide a novel adjustable wheel mount or method and apparatus by which the rim of the wheel is adjustably mounted on and connected to the wheel center or disk or vice versa, so that the wheel rims and tires may be adjusted in or out on the wheel center to vary the distance between the wheels or tread thereof, and by which one man is enabled to adjust any sized wheel or rim and tire on the wheel center to any desired position quickly and without great effort.

These objects and others which will be apparent are accomplished by a construction such as illustrated in the drawings, in which:

Figure 1 is a side view of a wheel having an adjustable mount in accordance with my invention.

Figure 2 is a diametrical section taken on the line 2—2 of Fig. 1.

Figure 3 is an enlarged fragmentary section taken on the line 3—3 of Fig. 1.

Figure 4 is a fragmentary side elevation showing the invention applied to dual wheels.

Figure 5 is a section taken on the line 5—5 of Fig. 4.

Figure 6 is a side view showing another form of the invention.

Figure 7 is a section taken on the line 7—7 of Fig. 6.

Figure 8 is a fragmentary enlarged section taken on the line 8—8 of Fig. 7.

Figure 9 is a fragmentary side elevation showing another form of the invention.

Figure 10 is a section taken on the line 10—10 of Fig. 9, and

Figure 11 is a section taken on the line 11—11 of Fig. 10.

Referring to the drawings in detail, in which like characters of reference indicate corresponding parts throughout the several views, and referring especially to Figs. 1, 2, and 3, there is shown a wheel 10 of any suitable type but indicated as of the type having a rim 11 similar to an automobile, tractor, or other machine wheel on which may or may not be mounted a tire 12 shown of the pneumatic type and retained by the usual flanges 13. The wheel further includes a wheel center plate, or disk 14 shown of the offset type having a central opening 15 for engaging a hub or axle and having a circular series of bolt holes 16 for bolting the same to an axle or hub flange in the usual way, although any other suitable construction of fastening means may be employed. The peripheral flat portion 17 of the disk or center plate 14 is provided with a plurality of equidistantly spaced depressed angular extensions or spiral portions 18 extending into an annular opening 19 between the rim 11 and periphery of center disk 14, and shown as four in number with right angular transversely extending radial apertured ears or lugs 20 disposed in substantial alignment diametrically in opposite sides or pairs, but preferably disposed on opposite sides of the center axis of the wheel and disk in opposite relation or pairs of a series.

Secured in similarly spaced relation transversely of the rim 11 at the inside, are a similar number of bars 21 which are secured rigidly to the rim in any suitable way, as by welding or otherwise, and shown disposed radially edgewise, parallel to the radial lugs 20 through the thickness of the rim or otherwise as desired depending on the length needed and degree of adjustment desired. As shown, the bars 21 have flat portions and may be of right angled form, such as ordinary angle iron to give the required stiffness and strength, with one flange secured to the rim and the other flange extending radially inwardly into the opening 19 against or parallel to lug 20 when the rim 11 and disk or center plate 14 are assembled. These bars 21 are provided with a plurality of equidistantly spaced or several otherwise related spaced holes 22 corresponding in size to the size of the hole or aperture in the lugs 20.

When the holes in the lugs 20 are brought in line with one set of holes in the bars 21, that is, the wheel is adjusted in or out as shown in solid and dotted lines in Fig. 2 of the drawings, so that the holes in all the lugs 20 on the wheel disk or center 14 are lined up with the corresponding holes 22 in the bars 21, bolts or other suitable fastening or clamping means 23, can then be inserted through the aligned holes and the nuts 24 thereof applied and tightened down so that the rim 11 is fastened tightly to the disk or wheel center 14 and the whole assembly becomes a unit wheel, permitting quick and easy adjustment of the wheels individually in or out and of opposed wheels at opposite sides of a vehicle, tractor, or machine to vary the distance therebetween or tread width between wheels at opposite sides for any purpose desired, such as in connection with different terrain or row crop work. As can be seen, the wheel or rim may be so positioned that any desired, set of the holes 22 in the bars 21 may be lined up with the holes in the lugs 20, or vice versa, and by shifting or positioning the wheels on both sides of the tractor or machine, any desired tread width may be obtained within the limits allowed for. While this construction is especially adapted for small light weight tires and rims or wheels that can be readily handled by one man, it may be used for larger and heavier wheels or tires and rims if desired.

In Figs. 4 and 5, a construction and method by which dual assemblies may be obtained and adjustment of tread width obtained, is illustrated. The construction is the same as shown and described in connection with Figs. 1, 2, and 3, except that two wheels or rims and tires are shown. In addition, long bars 26 of angle iron are employed. Bars 26 are laid against the bars 21 in opposite position, and provided with a larger number of plurality of spaced holes 27 and bolted to the lugs 20 and bars 21 by longer bolts 28 and clamped by nuts 29. Of course, the lugs 20 of the wheel center or disk 14 are provided only on one wheel, usually at the inside and the spaced outer wheel is bolted at two points, the same as at the inside to secure proper rigid and secure detachable connection whereby the wheels may be assembled in pairs or dual form properly spaced apart. In this construction and arrangement, adjustment of the wheels in and out may be effected to vary the tread width the same as previously described by removing the bolts, moving the wheels in or out and replacing the bolts through the respective aligned pairs or series of pairs of holes in the bars 21 and 26 and holes in the lugs 20 disposed against opposed bars 21 and 26 fitted together.

In the form shown in Figs. 6, 7, and 8, the wheel center or disk 30 is flat and has secured thereto or formed therein, oppositely projecting spaced pairs of radial apertured lugs 31 and 32, the former of which have larger holes 33 than the lugs 32. The inwardly extending flanges of the bars 21 of angle iron, as in Figs. 1, 2, and 3, and 25 in Figs. 4 and 5, extend loosely between the lugs 31 and 32 to align the holes of the latter with any set of holes 22 in the bars 21. Similar bolts 23 are engaged through the holes but the heads of the bolts 23 are inserted or pass therein to clamp against bars 21 and lugs 32 at nuts 24 to hold the wheel or rim with or without tire 12, and the wheel center plate or disk 30 tightly together and rigid as a unit wheel. Square headed or other suitable bolts 34 with nuts are inserted through holes near the ends of one or more of the bars 21 to keep the rim 11 from inadvertently slipping off the wheel center or disk 30. In this form, as well as the others, but especially where adapted for large wheels, the wheel center may be used on a slidingly adjustable axle 35 splined on a sleeve or hub 36 as at 37 and bearing or housing 38 with U-bolts 39 clamping the hub 36 to the axle or spindle 35, so that the positions of the wheels may be changed or adjusted as desired for tread width variation, and all positions of the wheels or rims reached without reversing, removing, or changing sides with the wheel or any of its components.

To change the position of the wheel or rim in this instance, for large wheels especially, the wheel is first raised clear of the ground, and the wheel turned until an opposite pair of the lugs and bars are horizontal. Then the wheel is lowered until the tire 12 or the rim 11 if no tire is used, has enough weight on it to prevent its falling over. The bolts 23 are then removed and the wheel or rim maneuvered to the desired position and if the same is of such weight and dimensions that it is easily handled, it can be easily pushed to the desired position, but if it is too heavy and large to be easily handled, it can be readily maneuvered to the desired position or shifted transversely by moving one side at a time and prying the bottom over. When the desired position is reached, the bolts 23 are reinserted and the nuts 24 tightened to fasten the components into a unit wheel.

In the form shown in Figs. 9, 10, and 11, the construction is the same as before except that flat bars 40 are secured rigidly to the rim 11 in any desired number. The disk 30 is flat and may be secured to the hub or axle, or a drum in any desired way. It is shown with opening 15 and bolts securing holes 16 as described in connection with Figs. 1 to 5 inclusive, but is not limited thereto. The wheel center or disk 30 is formed with or has secured thereto, spaced oppositely extending radial apertured lugs 41 and 42 in pairs. The lugs 41 may be resilient, by forming the cast or molded wheel and disk with slots 43 on each side extending into the disk 30 to give the desired resiliency, but the lugs 41 may be fastened to the disk in a resilient manner and holes provided in both lugs 41 and 42, the latter of which are shown rigid and shorter than the lugs 41 to facilitate this. Bars 40 are positioned between the lugs 41 and 42 and as before, a series of holes 22 provided in the bars 40 of the same size as the holes in the apertured lugs 41 and 42 to receive longer clamping bolts 44 with nuts 45. Thus, when the wheel or rim is placed in or adjusted to the desired position according to the spacing or tread width desired, with the holes lined up, the bolts are inserted and the nuts tightened so that the bars 40 are clamped between the pairs of spaced lugs 41 and 42 so that the parts are tightly clamped together to form the rim and wheel center or disk into a unit wheel with the bars and lugs sustaining the traction stresses and forces exerted thereon in moving, the same as in all the previously described forms and constructions.

Small plates 46 are fastened to the ends of one or more of the bars 40, and are of a shape corresponding to the cross section of said bar or bars 40, as shown, plates 46 are fastened by cap screws 47 entering threaded sockets in the ends of bars 40 in such a manner that when the screws are tightened and the plates 46 turned in one position to project above and below the top and bottom faces of the bars 40, they will keep the rim or wheel from inadvertently slipping off of the wheel center or disk when the bolts 44 are removed. However, by having the plates the same size and outline as the cross section of the bar or bars 40 they may be set or turned by loosening the cap screws 47 until their outline coincides with the ends of the bars when the wheel or rim may be readily slid off or easily removed from the wheel center or disk. In this instance, the bars will freely slide between the lugs as in the other forms to disengage from each other.

Thus, the wheel or rim, and tire if used, can be readily moved or adjusted from any position to any other position on the wheel center or disk in any of the forms described according to the spacing or tread width desired between the wheels, without reversing, changing, or removing the wheels or rims or changing sides, and with efficiency and dispatch by a single person instead of requiring two or more men to effect such adjustment for any purpose.

It is to be understood that applicant has shown and described only a preferred embodiment of his improved wheel construction and that he claims as his invention all modifications falling within the scope of the appended claims.

What I claim is:

1. In a wheel structure, the combination of a rim, a wheel center, a plurality of attaching ears arranged on the wheel center in spaced relation circumferentially thereof, transverse attaching bars correspondingly arranged on the rim and having longitudinal series of spaced openings therethrough, said rim being movable relative to the wheel center to locate it in different axial positions on said wheel center with different openings of the bars registered with the openings of the ears, and nutted bolts extending through the registered openings of the ears and bars for securing them together and the rim in axially adjusted positions relative to the wheel center.

2. In a wheel structure, the combination of a rim, a wheel center, a plurality of pairs of spaced attaching ears arranged on the wheel center in spaced relation circumferentially thereof, transverse attaching bars correspondingly arranged on the rim and having longitudinal series of spaced openings therethrough, said rim being movable relative to the wheel center to locate it in different axial positions on said wheel center with different openings of the bars registered with the openings of the pairs of ears, and nutted bolts extending through the registered openings of the ears and bars for securing them together and the rim in axially adjusted positions relative to the wheel center.

3. The construction defined in claim 2, wherein each bar slidably extends between a pair of said ears, and stop members secured on the opposite ends of certain of said bars and coacting with the associated ears prevent withdrawal of said bars from between said ears and limit axial adjustment of the rim relative to the wheel center.

4. The construction defined in claim 2, wherein each bar slidably extends between a pair of side ears, and stop members secured on the opposite ends of certain of said bars and coacting with the associated ears prevent withdrawal of said bars from between said ears and limit axial adjustment of the rim relative to the wheel center, one ear of each pair being laterally yieldable toward the other to provide for tight clamping of the associated bar between said pairs of ears.

5. In a wheel structure, the combination of two rims, a wheel center, a plurality of attaching ears arranged on the wheel center in spaced relation circumferentially thereof, transverse attaching bars correspondingly arranged on and projecting beyond one side of each rim, the bars of each rim overlapping those of the other rim, said rims being movable relative to the wheel center to locate them in different axial positions on said wheel center, and nutted bolts passing through the bars to secure the rims together and through the bars and ears for securing the rims in axially adjusted positions relative to the wheel center.

HERSCHEL HUTCHINGS.

REFERENCES CITED

The following references are of record in the file of this patent:

UNITED STATES PATENTS

| Number | Name | Date |
|---|---|---|
| 1,802,773 | Nelson | Apr. 28, 1931 |
| 2,129,807 | Beckman et al. | Sept. 13, 1938 |
| 2,175,294 | Jaeger | Oct. 10, 1939 |